A. E. WICKMAN.
VEHICLE WHEEL.
APPLICATION FILED MAR. 25, 1912.

1,094,956.

Patented Apr. 28, 1914.
2 SHEETS—SHEET 1.

WITNESSES

INVENTOR

BY

ATTY.

A. E. WICKMAN.
VEHICLE WHEEL.
APPLICATION FILED MAR. 25, 1912.

1,094,956.

Patented Apr. 28, 1914.

2 SHEETS—SHEET 2.

WITNESSES
Paul A. Viersen.
A. L. Walcutt.

BY

INVENTOR
A. E. Wickman
H. Sanders
ATTY.

UNITED STATES PATENT OFFICE.

ALBIN ERIK WICKMAN, OF WILLMAR, MINNESOTA.

VEHICLE-WHEEL.

1,094,956.   Specification of Letters Patent.   Patented Apr. 28, 1914.

Application filed March 25, 1912. Serial No. 686,193.

*To all whom it may concern:*

Be it known that I, ALBIN ERIK WICKMAN, a citizen of Sweden, residing at Willmar, in the county of Kandiyohi and State of Minnesota, have invented certain new and useful Improvements in Vehicle-Wheels, of which the following is a specification.

This invention relates to improvements in vehicle wheels and its object is to produce a wheel of this class especially serviceable on soft marshy roads.

Another object is to provide a wheel in which the rim is made of a plurality of curved connected links and any one of which may be removed and another substituted in case of breakage.

A still further object is to produce a wheel that will transmit the minimum jolt to the vehicle upon which it is used when traversing rough uneven roads.

With the foregoing and other objects in view the invention consists in the combination and arrangement of parts to be hereinafter fully described in the following specification, pointed out in the claims and illustrated in the accompanying drawings which form a part of said specification and in which—

Figure 1:
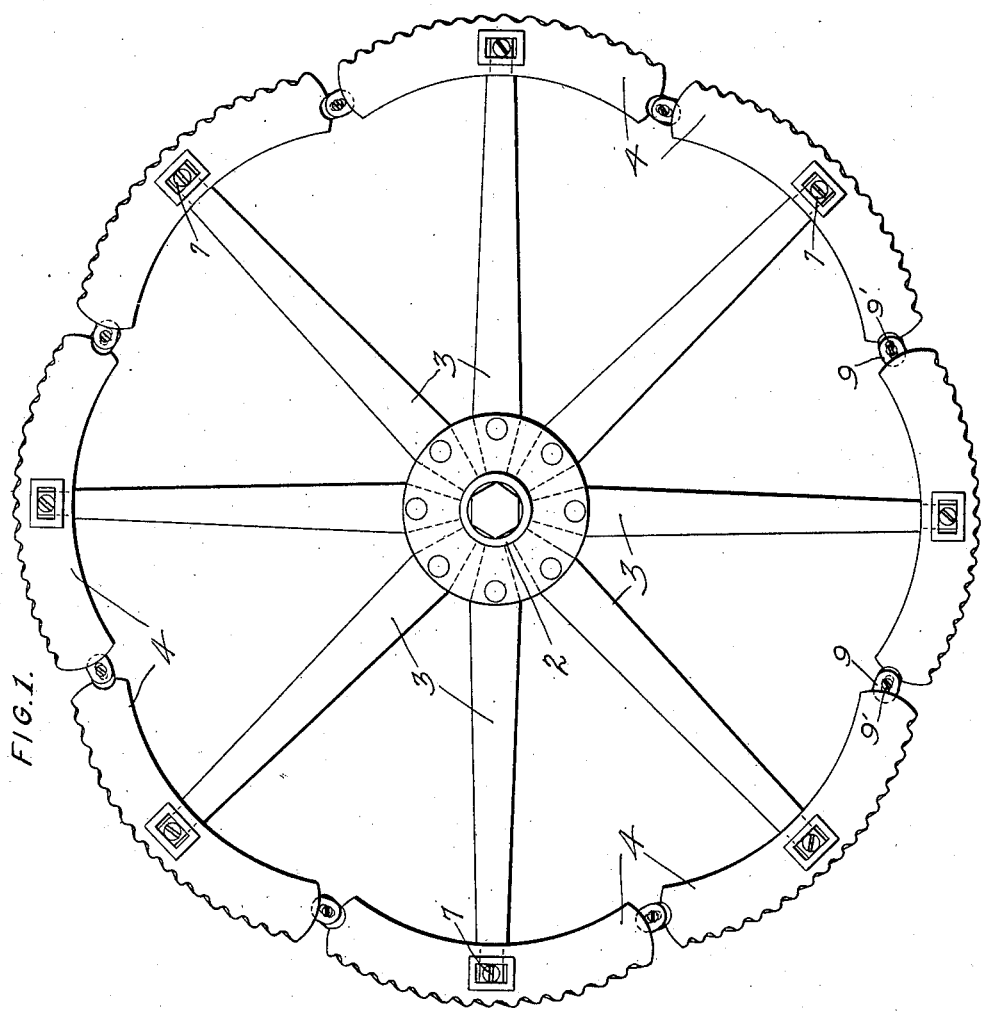
Figure 2:
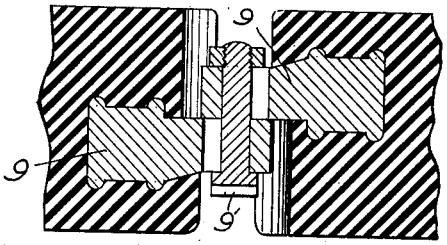
Figure 3:
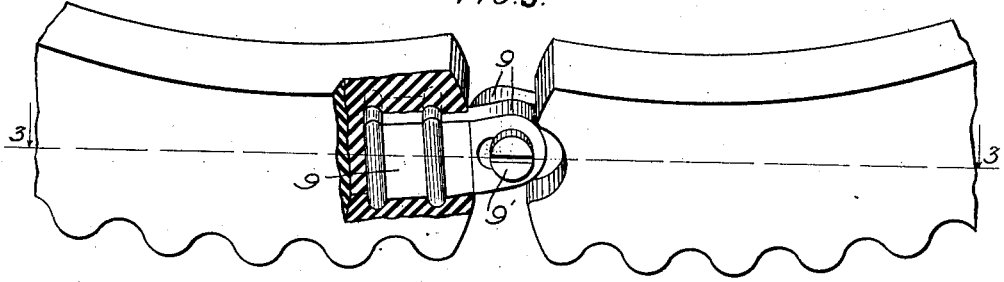
Figure 4:
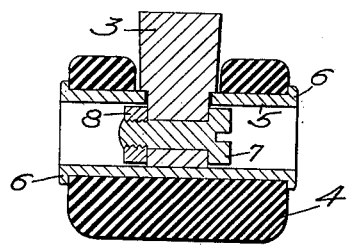
Figure 5:
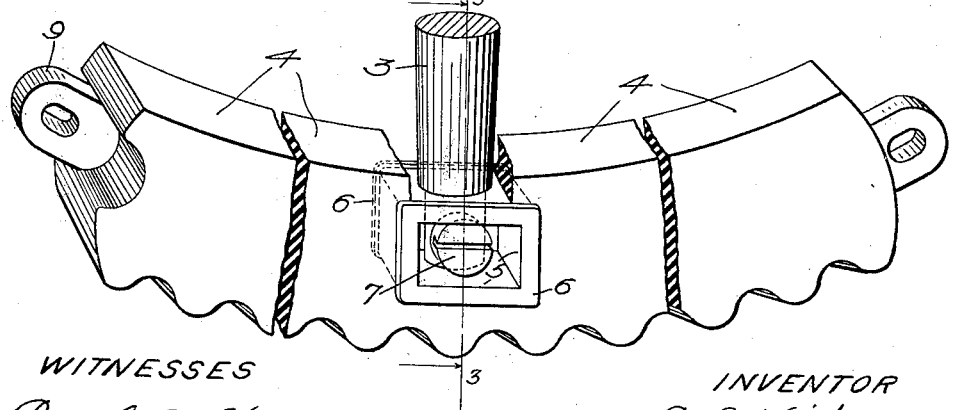

Figure 1 is a side elevation of my improved wheel. Fig. 2 is a section taken through two adjacent ends of two links in the rim of the wheel, and is taken on line 3—3 of Fig. 3. Fig. 3 is a view, partly in section, showing the manner of connecting two adjacent links in the rim. Fig. 4 is a section taken on line 3—3 of Fig. 5 showing the method of securing a spoke in one of the links of the rim. Fig. 5 is a broken perspective of one of the links of the rim.

Like reference characters indicate corresponding parts throughout the several views.

My wheel comprises a hub 1 rotative upon an axis 2 and provided with a plurality of spokes 3, 3, etc. The rim of my wheel is composed of a plurality of curved connected links 4, 4, etc., which are preferably formed of a resilient material such as rubber or the like and with a corrugated tread. Each link of the rim is apertured from its inner surface for the reception of one end of one of the spokes 3 and transversely with a communicating aperture for the reception of a bearing or box 5 for the said spoke, the outer flanges 6, 6 of the said bearing 5 being located outside the mouths of the transverse aperture as shown in Figs. 5 and 6. The end of the spoke 3 that enters the bearing 5 is reduced and apertured for the reception of a screw 7 the head of which is but a trifle less in diameter than the interior of the bearing 5 and the end of which is provided with a nut 8. This arrangement permits sufficient play of the parts to avoid breakage while it, at the same time, reduces the jar transmission to the minimum. Either end of each link 4 of the rim is provided with an apertured connecting lug 9 the body of which is embedded therein near one lateral face of said link and said link is recessed as at 10 from its opposite lateral face toward the lug 9, to permit passage of the adjacent lug 9 of the adjacent link. Adjacent lugs 9 are connected by pins 9'.

What is claimed is:—

1. The combination in a wheel provided with a hub and spokes radiating therefrom, of a rim comprising a plurality of curved resilient links each of which is formed with two apertures disposed in planes at right angles to each other, a bearing disposed in one of the apertured portions of each link, a spoke projected into the other apertured portion of said link and terminating in said bearing, locking means for said spoke disposed within said bearing, and connecting members carried by each link.

2. The combination in a wheel provided with a hub and spokes radiating therefrom, of a rim comprising a plurality of curved resilient links each of which is formed with two apertures disposed in planes at right angles to each other and with oblique terminal recesses, a bearing disposed in one of the apertured portions of each link and formed with terminal flanges projected beyond said link, a spoke projected into the other apertured portion of said link and terminating in said bearing, locking means for said spoke disposed within said bearing, lugs terminally carried by each of said links in alinement with the terminal recesses therein and locking means for said lugs.

In testimony that I claim the foregoing as my own I have hereto affixed my signature in the presence of two subscribing witnesses.

ALBIN ERIK WICKMAN.

Witnesses:
  ALICK. WESTERBERG,
  ALBIN E. WAHLSTRAND.